United States Patent
Duty et al.

(10) Patent No.: US 6,252,950 B1
(45) Date of Patent: Jun. 26, 2001

(54) PREDICTIVE BURSTY REAL-TIME TRAFFIC CONTROL FOR TELECOMMUNICATIONS SWITCHING SYSTEMS

(75) Inventors: David Allen Duty, Bolingbrook; Jose Guadalupe Ruiz, Chicago, both of IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/163,614

(22) Filed: Sep. 30, 1998

(51) Int. Cl.$^7$ .................................................. H04M 15/00
(52) U.S. Cl. ......................... 379/111; 379/113; 379/137; 379/133
(58) Field of Search ..................... 379/111, 112, 379/113, 133, 268, 269, 137, 141, 288, 309

(56) References Cited

U.S. PATENT DOCUMENTS

| | | | |
|---|---|---|---|
| 3,965,305 | * 6/1976 | Ng et al. | 379/288 |
| 4,696,029 | * 9/1987 | Cohen | 379/112 |
| 5,425,086 | * 6/1995 | Hidaka et al. | 379/113 |
| 5,450,483 | * 9/1995 | Williams | 379/279 |
| 5,513,257 | * 4/1996 | Yoo et al. | 379/220 |
| 5,521,971 | * 5/1996 | Key et al. | 379/220 |
| 5,615,255 | * 3/1997 | Lemieux | 379/230 |

(List continued on next page.)

OTHER PUBLICATIONS

Higuera, J. A. G. et al, "Progressive Method Of Overload Control For Processors", Proceedings Of The International Teletraffic Congress (ITC–9), Torremolinos, Spain, Oct. 17–24, 1979, XP002045440, pp. 1–8.

"Electronic Switching", Elsevier Science Publishers B V, 1983, ISBN 0–444–86448–2, XP002130357, Part IV, Chapter 1, pp. 413–415.

Abdou, E. et al., "Overload Modelling Of Switching Systems And The Evaluation Of Overload Controls", Proceedings Of The National Telecommunications Conference, New Orleans, LA, Nov. 29–Dec. 3, 1981, XP002130355, pp. B4.4.1–B4.4.5.

(List continued on next page.)

Primary Examiner—Curtis Kuntz
Assistant Examiner—Quoc D. Tran
(74) Attorney, Agent, or Firm—N. R. Ormos

(57) ABSTRACT

A traffic control system (and associated method) according to the present invention includes a feedback control mechanism in which the controlled variable is processor occupancy, the controlling variable is the amount of resources necessary to satisfy the operational requirements of the switching system, and the set point is the average expected load based on a Poisson arrival rate. Current processor occupancy is compared, on an instantaneous basis against the set point to determine if it exceeds the average expected load. If so, the controlling variable is adjusted to allocate additional resources to process the offered traffic load. The process continues until the traffic burst expires. Additional resources may be obtained by eliminating or deferring non-essential work, and by allocating additional call registers, effectively accepting work in larger increments or batches. By instantly and proactively responding to traffic bursts, this traffic control system aids the switching system in weathering brief periods of high traffic, without actually reaching an overload condition and invoking overload controls. As a result, switching system capacity is increased, and other performance characteristics are improved.

17 Claims, 3 Drawing Sheets

U.S. PATENT DOCUMENTS

| | | | | |
|---|---|---|---|---|
| 5,734,655 | * | 3/1998 | Sakurai et al. | 370/396.1 |
| 5,778,057 | * | 7/1998 | Atai | 379/220 |
| 5,883,939 | * | 3/1999 | Friedman et al. | 379/9 |
| 5,933,481 | * | 8/1999 | MacDonald | 379/137 |
| 5,949,868 | * | 9/1999 | Hamano | 379/219 |
| 5,995,510 | * | 11/1999 | Sakurai et al. | 370/396 |

OTHER PUBLICATIONS

Stanley, D. V., "Capacity Modeling Of The No. 4ESS", Proceedings of the First Annual Conference On Computers And Communications, Phoenix, AZ, XP002130356, May 9–12, 1982, pp. 364–368.

* cited by examiner

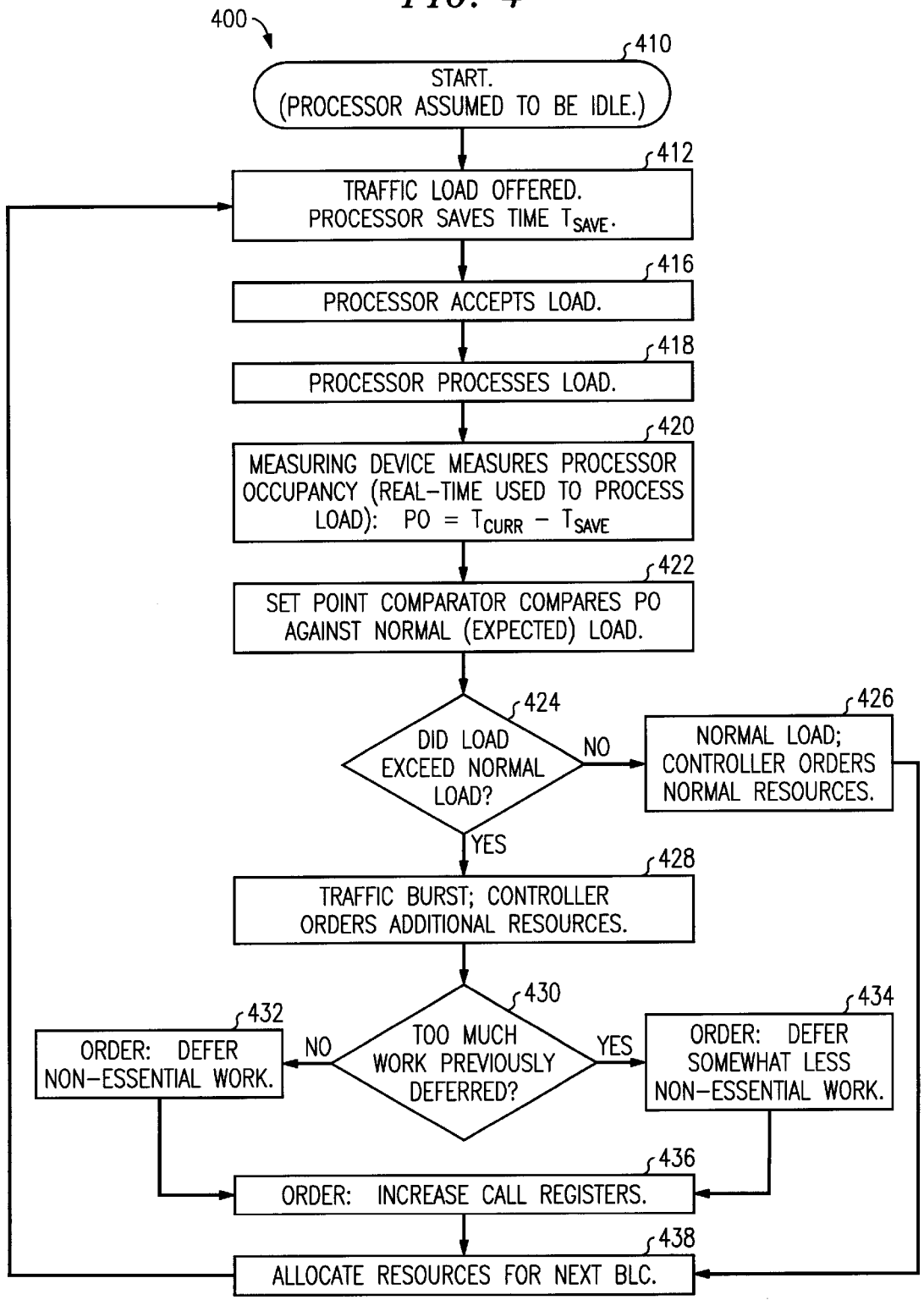

PREDICTIVE BURSTY REAL-TIME TRAFFIC CONTROL FOR TELECOMMUNICATIONS SWITCHING SYSTEMS

FIELD OF THE INVENTION

This application relates to telecommunications switching systems, and more particularly to systems for controlling a telecommunications switching system to optimize performance when confronted with peak loads.

BACKGROUND OF THE INVENTION

The practice of designing telecommunications systems and networks to meet expected traffic demand is well advanced. Nonetheless, sudden bursts of traffic can cause significant congestion in modern telecommunications systems, including telecommunications switching systems.

Most modern telecommunications switching systems employ "common control", in which a common pool of control components and associated resources are generally available to process arriving calls. The control components and resources are assigned to any particular call for very limited periods during call set-up, call tear-down, and occasionally during a conversation when services are requested by a user. Accordingly, when call arrival rates are high, a limiting factor in a switching system's ability to satisfy traffic demand is the limited availability of the common control components to attend to the calls.

Moreover, most modern telephone switching systems implement common control using "stored-program control" (SPC), in typical applications of which one or more computers, each including a processor and appropriate software, cooperate with peripheral devices to achieve the required functionality of the switching system. Thus, in SPC systems, the aforementioned limiting factor of limited availability of the control components directly translates to limited availability of the processor to perform real-time control tasks.

Many aspects of switching system engineering treat performance in the aggregate, and assume that the distribution of call arrivals approximates a Poisson distribution. In particular, SPC systems are engineered to carry a maximum traffic load based on the assumption that traffic arrival rates are Poissonian. SPC systems use buffer sizing, queuing, token based schemes, and processor occupancy levels to detect when the processor is overloaded. The maximum acceptable level of processor occupancy is predicted on the basis of statistical sampling and on assumptions derived from Traffic Theory. When processor occupancy exceeds the statistically predicted maximum acceptable level, the switching system is determined to be in real-time overload.

A real-time overload can degrade the speed and grade of service provided by the switching system. If due to overload a switching system does not respond within expected periods to communications from another switch, the other switch may abandon the call entirely, or may abandon the current attempt and retry. As a result, effects of the overload propagate through the network. In addition, the overloaded switch must expend additional real-time resources to "clean up" the abandoned call or to process a subsequent retried call, further contributing to the overload.

Accordingly, switching systems have provided certain overload controls for protecting the operation of the system when overload is detected. To mitigate the effects of real-time overload, a sequence of actions ranging from eliminating or deferring non-essential tasks, to deferring or refusing incoming work, depending on the apparent severity of the overload, may be employed. Deferring or refusing incoming work may take a number of forms. In severe overload conditions, a switching system may refuse to accept new calls for processing and may even instruct other switches not to send calls to the overloaded system. In less severe situations, certain ordinarily scheduled tasks which are less time-critical than call processing are readily deferred or reduced in frequency. Although many of these actions are effective in protecting the switching system so that improper operation is avoided with respect to existing calls and those new calls which are accepted for processing, these actions may also increase overhead, thereby actually reducing the real-time available to process calls, and artificially reducing switch capacity.

For example, consider an approach taken in the Number 4 Electronic Switching System (4 ESS), a product of Lucent Technologies, Inc., the assignee of this application. (The 4 ESS switching system is described in *Bell System Technical Journal*, September 1977 (entire issue) and *Bell System Technical Journal*, July-August 1981 (entire issue).) In the 4 ESS switching system, overload conditions of progressively increasing severity are declared when the mean execution time of a basic unit of work in the real-time operating system, measured over the last 8 work units, initially exceeds 130 ms, and at several predefined thresholds. When an overload condition is declared, the switching system may take several protective actions to control the overload or at least minimize its effects on the switch.

In one aspect of the overload control response, the number of available call registers, a data structure used to hold call-related information during the course of processing a call, may be progressively reduced. Since a call register is required in order to accept an incoming call for processing, reducing the number of call registers effectively reduces the size of the batch of calls the switch will accept for processing in a "base-level cycle" (the basic unit of work alluded to above). However, this requires that calls not accepted for processing in the current base-level cycle be inserted in a queue, and later removed from the queue and processed, undesirably increasing overhead and further reducing real-time available for processing calls.

As noted above, SPC-based switching systems are engineered based on the assumption that traffic arrival rates are Poissonian. However, we and others have observed that calls often arrive in bursts. Although the average call arrival rate over some period including the bursts may be well under the time-averaged capacity of the switching system, the instantaneous arrival rate during the burst itself may far exceed the average capacity of the switching system.

This is shown schematically in FIG. 1, in which traffic load (corresponding to the vertical axis 84) is plotted against time (corresponding to the horizontal axis 82). Line 86 represents the maximum engineered load 86. The smooth curve 88 represents the expected distribution of call arrivals, which approximates a Poisson distribution, over an engineered busy hour. The engineered busy hour is a one-hour period which reflects the maximum planned traffic to be offered to the switching system. The load increases gradually to the maximum engineered load 86, and then gradually recedes. Curve 90 represents a typical scenario during a busy period, in which a burst of traffic 92 occurs. The traffic load during burst 92 substantially exceeds the maximum engineered load 86 for a short interval. However, the average load over a period including and surrounding the burst 86 remains well within the maximum engineered load.

The design of existing switching systems and their controls recognizes that non-Poisson traffic arrival rates do occur. However, existing switching systems respond to non-Poisson traffic only when it affects system performance, and, in general only when congestion occurs. Moreover, existing switching systems of which we are aware treat overloads alike, by responding to congestion as though resulting from continuous traffic demand exceeding the maximum engineered load, regardless of whether the congestion is actually the result of excessive continuous demand, or simply a product of a transient burst of high traffic. The systems tend to operate in one of two states-normal state or overload state. Because the overload controls are set based on the assumption that traffic is Poissonian, the system's response to congestion becomes fixed and results in an artificial limit on the capacity of the switching system.

Accordingly, there exists a need for a switching system traffic control system which provides improved response to bursty traffic loads.

OBJECTS AND SUMMARY OF THE INVENTION

It is therefore an object of the present invention to provide a switching system traffic control arrangement which avoids the aforementioned disadvantages of prior-art systems.

A traffic control system (and associated method) according to the present invention includes a feedback control mechanism in which the controlled variable is processor occupancy, the controlling variable is the amount of resources necessary to satisfy the operational requirements of the switching system, and the set point is the average expected load based on a Poisson arrival rate. Current processor occupancy is compared, on an instantaneous basis against the set point to determine if it exceeds the average expected load. If so, the controlling variable is adjusted to allocate additional resources to process the offered traffic load. The process continues until the traffic burst expires. Additional resources may be obtained by eliminating or deferring non-essential work, and by allocating additional call registers, effectively accepting work in larger increments or batches. By instantly and proactively responding to traffic bursts, this traffic control system aids the switching system in weathering brief periods of high traffic, without actually reaching an overload condition and invoking overload controls. As a result, switching system capacity is increased, and other performance characteristics are improved.

BRIEF DESCRIPTION OF THE DRAWINGS

These and other features of the invention will be best understood by reference to the following detailed description of a preferred embodiment of the invention, taken in conjunction with the accompanying drawings, in which:

FIG. 4 is a flow diagram showing an exemplary method according to the present invention for use in conjunction with a telecommunications switching system.

DETAILED DESCRIPTION OF THE PREFERRED EMBODIMENT

Figure 1:
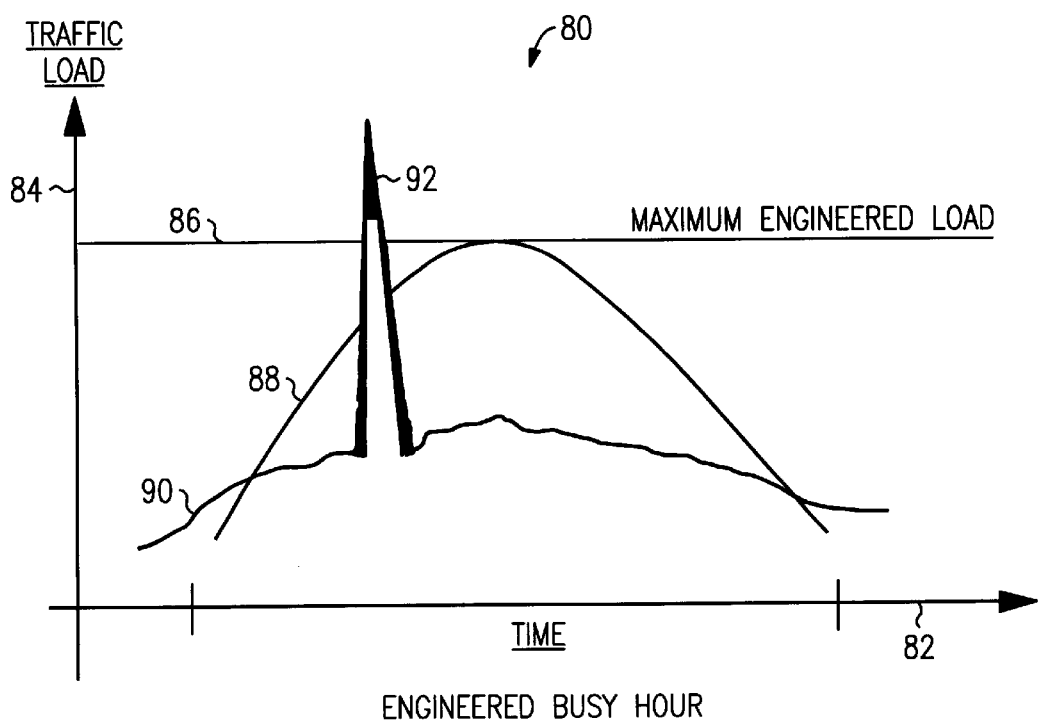
FIG. 1 is a plot of traffic load over time, showing in comparison a representation of an expected distribution of traffic load and a representation of traffic load distribution as typically experienced by a switching system during a busy period.
Figure 2:
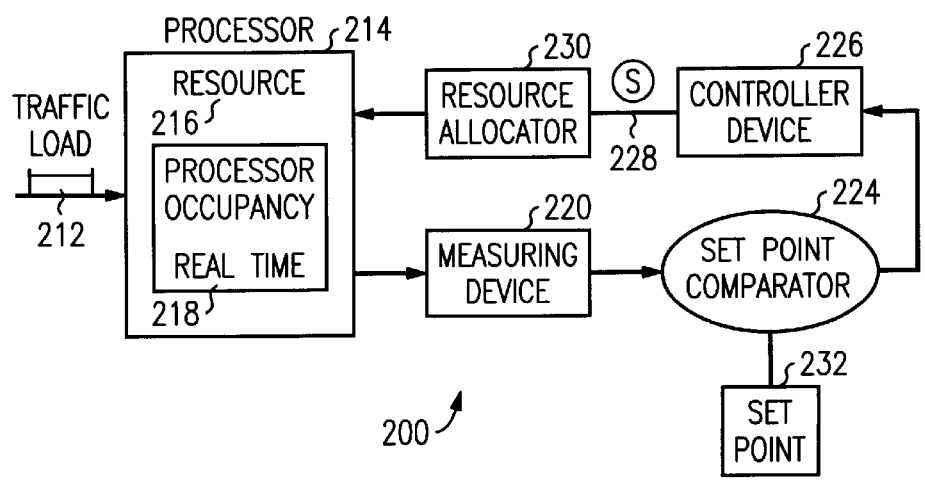
FIG. 2 is a block diagram of an exemplary embodiment 200 of a predictive real-time traffic control system arranged according to the present invention for use in conjunction with telecommunications switching systems or other telecommunications network components.

FIG. 2 is a block diagram of a preferred embodiment 200 of a predictive real-time traffic control system arranged according to the present invention for use in conjunction with telecommunications switching systems or other telecommunications network components. The preferred embodiment 200 is described herein in the exemplary environment of the aforementioned 4 ESS switching system in which it may be employed. However, the present invention could also be applied to other telecommunication switching systems and various other telecommunications network equipment. One of skill in the art will appreciate how the exemplary embodiment described herein may be modified, consistent with the present invention, for use in such applications.

As best seen in FIG. 2, a preferred embodiment 200 of the traffic control system of the present invention may be arranged as a feedback loop type control system. The elements of the feedback loop, shown as blocks in the diagram, are preferably implemented as one or more software modules forming part of the operating system of the processor of a stored program telecommunications switching system. However, the elements of the feedback loop could also be implemented in software modules outside of the operating system, and could, for example, be implemented in an adjunct processor or the like. Alternatively, the elements of the feedback loop could be implemented using other suitable control components, such as a special-purpose digital control system or analog computational elements.

The traffic control system feedback loop 200 predicts an impending overload system based on the current occupancy of the switching system processor 214. The controlled variable in the feedback loop is processor occupancy, represented by box 218. The controlling variable is the amount of resources 216 necessary to satisfy the operating requirements of the system (i.e., to process the offered traffic load). The set point 232 of the system is the average expected load based on a Poisson arrival rate.

As best seen in FIG. 2, a traffic load 212 is offered to the processor 214 of the telecommunications switching system. The primary load in a switching system comprises call attempts which are to be processed by the switching system. Because the primary application of the 4 ESS switching system is as a toll switch, most calls arrive on trunks and are switched to other trunks, thereby extending the calls toward their destinations. Switches used in other applications have access lines and may originate calls, terminate calls, or both. The presence of a call is typically detected by peripheral equipment (not shown) which is in communication with the processor.

The operating system software running on the processor has resources 216 which may be allocated to process calls. For example, the operating system may allocate a call register (essentially, a data structure in which information about a call is stored during processing of the call). In addition, the operating system allocates processor time (real-time) 218 to call processing tasks to enable calls to be processed. Processor time is a finite resource. Processor occupancy is effectively an indication of how busy the processor is, and may be measured in several ways. In connection with the 4 ESS switching system, processor occupancy is preferably determined by measuring the execution time of a "base-level" cycle, a basic unit of work in the switching system.

Since measurement of processor occupancy and allocation of the processor real-time resource are important elements of the traffic control system, it may be helpful to consider how this resource is managed in the 4 ESS switching system. In order to better understand the operation of the traffic control system 200, it may be helpful to consider the real-time task scheduling facilities of the 4 ESS switching system. However, if the traffic control system were applied to another switching system, measurement of processor occupancy (or another proxy for system loading), and allocation of processor real-time, may be performed differently.

Figure 3:
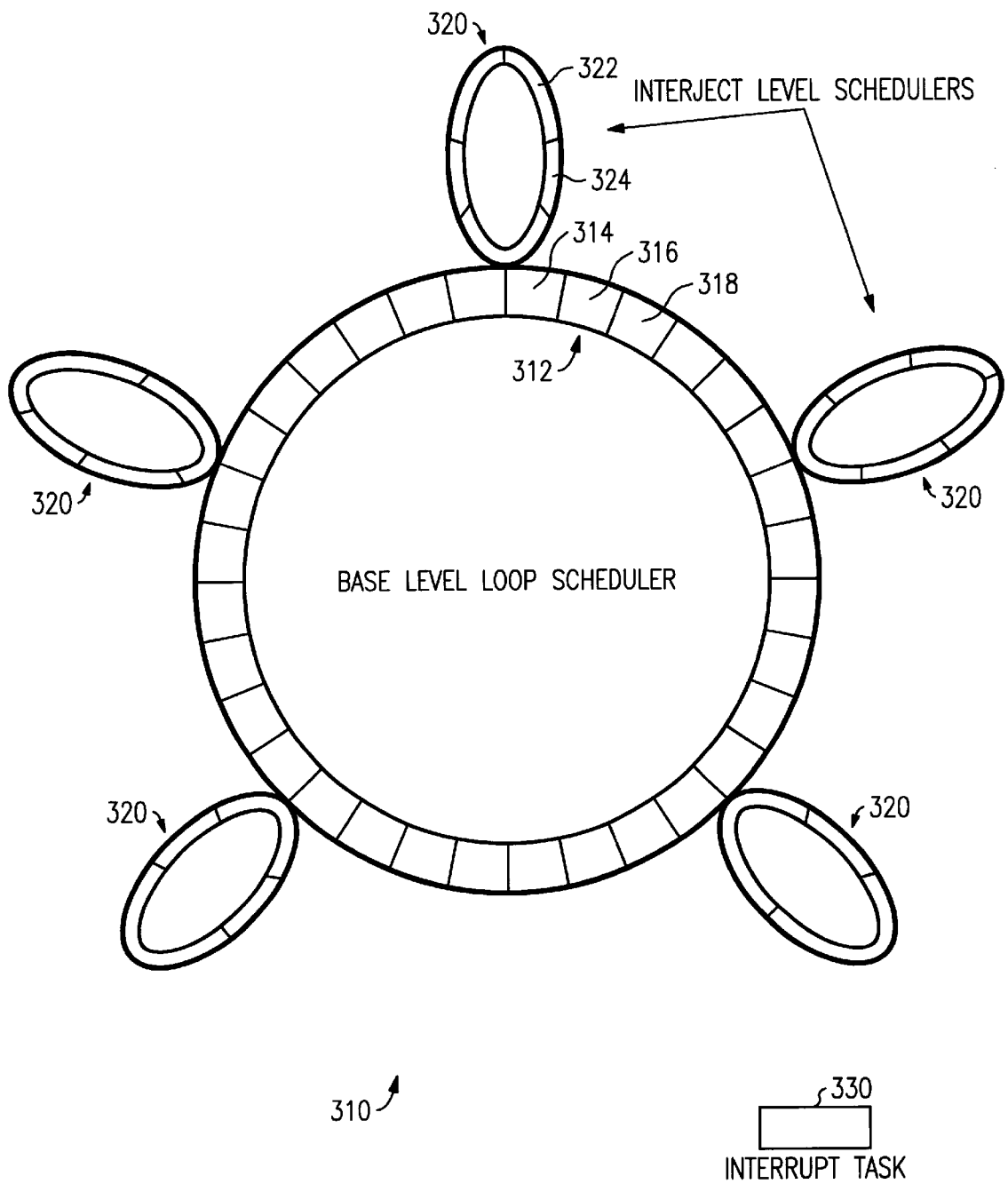
FIG. 3 is a block diagram depicting the scheduling of tasks in the operating system of a stored-program control telecommunications switching system.

As best seen in FIG. 3, the 4 ESS switching system has three primary routes or levels by which processor real-time is allocated to tasks: a base-level loop scheduler 312, interject level schedulers 320, and interrupt tasks 330. The base level loop or cycle 312 comprises a plurality of tasks (e.g., approximately 30) for which timing is relatively flexible. Tasks, such as tasks 314, 316, and 318 in the base-level cycle are generally executed in turn, on a round-robin basis, until they complete. However, base-level tasks are limited by policy to 3 ms of processor time per turn, and if a task fails to relinquish the processor within 10 ms, an interrupt occurs and the operating system allocates the processor to the next task.

Because base-level cycle tasks execute until they complete, and the load offered to the switching system varies, so also do the execution times of each base-level task and the base-level cycle as a whole. The base-level cycle time is the primary measure of processor occupancy. As more load is presented to the switching system, the base-level cycle time increases. Most of the base-level tasks can operate satisfactorily if they are executed each time their turn occurs in the base-level cycle, provided that the delay between like turns of successive cycles does not exceed the established maximum base-level cycle time. The maximum cycle time is selected to be 130 ms, in order to ensure that base-level cycles are processed frequently enough to meet system performance specifications. The delay between a call's arrival and its extension toward another switch is referred to as cross-office delay. Telecommunications network operators specify that the cross-office delay not exceed 150 ms. Some base-level tasks may be deferred when the load on the switching system is high.

Interject level schedulers 320 are provided for tasks, such as interject level tasks 322, 324 which have more precise timing requirements. Interject level schedulers 320 are eligible to run at scheduled intervals. Once an interject level scheduler 320 becomes eligible to run, the operating system allocates it to run as soon as the currently-running base-level task completes. Thus, the tasks 322, 324 of interject level schedulers 320 are interjected between base-level tasks at the next available base-level-task boundary. Interrupt tasks 330 run immediately when hardware detected events occur.

Returning to FIG. 2, processor occupancy 218 is determined by measuring the base-level cycle time. A measuring device 220 is operatively coupled to measure the processor occupancy. In contrast to prior-art overload controls, which measure average processor occupancy over plural cycles, in the control system 200, the processor occupancy is measured, and the traffic control system can react thereto, every base level cycle. A set point generator 232 is provided to establish an expected processor occupancy (i.e., base-level cycle time) corresponding to "normal" traffic load. A set-point comparator 224 receives the output of measuring device 220 and the set-point from set-point generator 232, to determine whether processor occupancy exceeds the set-point, thereby indicating traffic load is high, and remedial action should be taken. Based on empirical observations of the 4 ESS switch, we believe that a range of 60 to 90 ms is suitable as a set-point defining "normal" traffic load, with 80 ms being an optimum value. This number, of course, would vary if the system were applied to other switching systems having different processor capabilities, architecture, and performance expectations.

A controller device 226 receives the output of the set-point comparator to determine the amount of resources to allocated based on the measured processor occupancy. The output 228 of the controller device 226 is the feedback signal used to control processor occupancy. The resource allocator 230 receives the feedback signal 228 from controller device and allocates resources in processor 214 as instructed thereby.

In an exemplary embodiment of the invention, the resources which may be allocated when traffic load exceeds the normal load are: additional processor time; and additional call registers. Processor time is added by inhibiting execution of certain deferrable tasks. For example, in each base-level cycle executed following a high-load cycle, deferrable tasks corresponding to 9 ms of processor time may be inhibited. However, it is desirable for the deferrable tasks to occasionally run. Accordingly, the controller device preferably determines whether 9 ms of deferrable tasks has been inhibited in the last two cycles, and if so, orders inhibition only 6 ms of deferrable tasks in the current cycle. The additional call registers are preferably allocated in a group of 8 registers. Although the additional resources could be allocated variably in proportion (or some other relationship) to the severity of the load, we have found that allocating the additional resources in a single step is sufficient to relieve prospective overloads due to bursty traffic of the type described herein.

FIG. 4 is a flow diagram showing an exemplary method 400 according to the present invention for use in conjunction with a telecommunications switching system. The method begins in step 410, in which the processor is assumed to be idle. In step 412, a load of traffic is offered to the switching system. The processor records the time for use in measuring the base-level cycle time. In step 416, the processor accepts the load of traffic for processing during the upcoming base-level cycle. In general, the processor accepts as many offered calls as there are call registers which have been allocated. In step 418, the processor processes the accepted calls.

In step 420, the measuring device measures processor occupancy—i.e., the real time used to process the load, by subtracting the current time from the time value saved in step 412. In step 422, set point comparator 224 compares the measured processor occupancy for the preceding base-level cycle to the normal or expected processor occupancy. In step 424, the controller device 226 determines, responsive to the set-point comparator 224, whether the measured load exceeded the normal or expected load. If the measured load did not exceed the normal load, then step 426 is executed, in which the controller device orders a normal level of resources. Thereafter, the method continues at step 438.

However, if the measured load exceeded the normal load, then a traffic burst may be occurring, and an overload may be imminent. In step 428, based on the prediction that an overload may be imminent, the controller device prepares to order allocation of additional processor real-time and call register resources. Additional processor real-time is allocated by deferring execution of certain non-time-critical tasks. However, such tasks should not be deferred indefinitely. Accordingly, in step 430, the controller device determines whether, in previous cycles, more than a threshold level of work was deferred. For example, the controller device may determine whether in each of the last two base-level cycles, a full 9 ms of work was deferred. If so, the controller device executes step 434, and orders deferral of somewhat less work (e.g., 6 ms) in the upcoming base-level cycle. If the threshold amount has not been deferred, then the controller device executes step 432, and orders deferral of the full 9 ms of non-time-critical work.

In either case, the controller device then executes step 436, in which it orders allocation of additional call registers. In contrast to prior art overload control systems, which respond to overload by reducing or curtailing acceptance of calls for processing, the step of allocating additional call registers causes the switching system to take on more calls for processing during the upcoming base-level cycle. Although this practice extends the base-level cycle somewhat, if started sufficiently early, in response to traffic bursts, it is expected that the base-level cycle will remain below the overload threshold. Taking on additional work during an upcoming cycle, in conjunction with deferring non-time-critical work, allows more calls to be processed, and avoids the need for queuing, which, if required, incurs substantial overhead.

We have observed that in a 4 ESS switching system under test load conditions, the addition of eight call registers to those normally allocated, in conjunction with the deferral of 6–9 ms of work per base-level cycle, provides significant relief from the effects of a traffic burst. However, other additional resources could also be used. In other switching systems, different additional resources or levels thereof may be optimal. In step 438, the resource allocator allocates resources responsive to instructions from the controller device. Then, the method returns to step 412 to process additional calls.

Thus, an inventive traffic control system for a telecommunications switching system has been disclosed which instantaneously responds to the occurrence of transitory non-Poisson traffic arrival rates. Advantageously, the traffic control system provides a pro-active mechanism that enables the system to ride out peak traffic loads without activating overload controls. As a result, system call processing capacity is improved, as are other performance characteristics.

The above-described embodiment of the invention is merely one example of a way in which the invention may be carried out. Other ways may also be possible and are within the scope of the following claims defining the invention.

What is claimed is:

1. A traffic control for a telecommunications switching system, said system attained to receive offered calls and to accept some number of said offered calls for processing, said traffic control comprising:

means for measuring a performance value of said system indicative of the amount of system resources consumed in processing said accepted calls, means for establishing a normal level of said performance value;

means for establishing a normal amount of said offered calls to be accepted for processing;

a plurality of call registers for storing information about said accepted calls, wherein each of said call registers is a data structure adapted to hold call-related information while processing a call;

each of said normal amount of accepted calls being respectively associated with at least one of said plurality of call registers during processing of said calls;

means for comparing said performance value to said normal level;

means responsive to said comparing means for causing said switching system to accept a number of calls greater than said normal amount when said performance value exceeds said normal level; and means for allocating at least one additional call register for each of said number of accepted calls greater than said normal amount when said performance value exceeds said normal level.

2. The traffic control of claim 1 wherein:

said switching system is a stored-program control switching system comprising a processor, and some amount of time of said processor is allocated to processing calls.

3. The traffic control of claim 2, further comprising means responsive to said comparing means for causing said switching system to allocate additional processor time to call processing when said performance value exceeds said normal level.

4. The traffic control of claim 1 further comprising means responsive to said comparing means for deferring non-time-critical tasks when said performance value exceeds said normal level.

5. A traffic control for a telecommunications switching system, said system arranged to receive offered calls and during each of successive processing periods to accept some of said offered calls for processing, said traffic control comprising:

means for measuring a performance value of said system indicative of the amount of system resources consumed in processing said accepted calls during a previous processing period;

a plurality of call registers for storing information about said accepted calls, wherein each of said call registers is a data structure adapted to hold call-related information while processing a call; said switching system respectively associating at least one of said call registers with each of said accepted calls;

means for establishing a normal level of said performance value;

means for establishing a normal amount of said call registers to be allocated for processing calls during a processing period;

means for comparing said performance value to said normal level; and means responsive to said comparing means for causing said switching system to allocate an amount of said call registers greater than said normal amount when said performance value exceeds said normal level.

6. The traffic control of claim 5 wherein:

said switching system is a stored-program control switching system comprising a processor, and some amount of time of said processor is allocated to processing calls.

7. The traffic control of claim 6, further comprising means responsive to said comparing means for causing said switching system to allocate additional processor time to call processing when said performance value exceeds said normal level.

8. The traffic control of claim 5 further comprising means responsive to said comparing means for deferring non-time-critical tasks when said performance value exceeds said normal level.

9. The traffic control of claim 5 wherein switching system executes certain tasks during a base level cycle and said performance value is a measure of time required to complete said base level cycle.

10. A method for use with a telecommunications switching system, the switching system being arranged to receive offered calls and to accept some number of the offered calls for processing, the switching system having means for measuring a performance value indicative of the amount of system resources consumed in processing the accepted calls, comprising the steps of:

(a) establishing a normal level of said performance value;

(b) establishing a normal amount of said offered calls to be accepted for processing;

(c) accepting and processing a group of said offered calls;

(d) measuring said performance value resulting from said processing of said group of offered calls;

(e) comparing said performance value to said normal level;

(f) if said performance value does not exceed said normal level, then preparing to accept and process a next group of offered calls not larger than said established normal amount, including allocating a first number of call registers for use in processing said accepted calls, wherein each of said call registers is a data structure adapted to hold call-related information while processing a call;

(g) if said performance level does exceed said normal level, then preparing to accept and process a next group of offered calls larger than said established normal amount, including allocating a number of call registers larger than said first number for use in processing said accepted calls.

11. The method of claim 10 wherein said switching system is a stored-program switching system comprising a processor, and some amount of time of said processor is allocated to the function processing calls, and wherein step (g) thereof further comprises the step of:

(g1) allocating additional processor time to the function of processing calls.

12. The method of claim 10 wherein step (g) thereof further comprises the step of:

(g1) deferring non-time-critical tasks.

13. The method of claim 12 wherein step (g1) further comprises the steps of:

(g1a) determining an amount by which non-time-critical tasks were deferred during earlier processing of calls;

(g2a) if the amount by which non-time-critical tasks were deferred does not exceed a predetermined threshold, deferring non-time-critical tasks by a first amount during current or subsequent processing; and (g3a) if the amount by which non-time-critical tasks were deferred exceeds a predetermined threshold, deferring non-time-critical tasks by a second amount smaller than said first amount during current or subsequent processing.

14. A method for use with a telecommunications switching system, the switching system being arranged to receive offered calls and during each of successive processing periods to accept some of the offered calls for processing, the switching system having means for measuring a performance value indicative of the amount of system resources consumed in processing the accepted calls, the switching system further having a plurality of information storage elements adapted to hold call-related information while processing a call, comprising the steps of:

(a) establishing a normal level of said performance value;

(b) establishing a normal amount of said offered calls to be accepted for processing;

(c) accepting and processing a group of said offered calls during a processing period;

(d) measuring said performance value resulting from said processing of said group of offered calls;

(e) comparing said performance value to said normal level;

(f) if said performance value does not exceed said normal level, then allocating for use in processing calls during a subsequent processing period a number of said information storage elements corresponding to that needed to process said normal amount of accepted calls, and accepting and processing a number of said offered calls no greater than said normal amount;

(g) if said performance level does exceed said normal level, then allocating for use in processing calls during a subsequent processing period a number of said information storage elements greater than that needed to process said normal amount of accepted calls, and accepting and processing a number of said offered calls greater than said normal amount.

15. The method of claim 14 wherein said switching system is a stored-program switching system comprising a processor, and some amount of time of said processor is allocated to the function processing calls, and wherein step (g) thereof further comprises the step of:

(g1) allocating additional processor time to the function of processing calls.

16. The method of claim 14 wherein step (g) thereof further comprises the step of:

(g1) deferring non-time-critical tasks.

17. The method of claim 16 wherein step (g) further comprises the steps of:

(g1a) determining an amount by which non-time-critical tasks were deferred during and earlier processing period;

(g2a) if the amount by which non-time-critical tasks were deferred does not exceed a predetermined threshold, deferring non-time-critical tasks by a first amount during a current or subsequent processing period; and (g3a) if the amount by which non-time-critical tasks were deferred exceeds a predetermined threshold, deferring non-time-critical tasks by a second amount smaller than said first amount during a current or subsequent processing period.

* * * * *